United States Patent
Easty et al.

(10) Patent No.: US 6,448,987 B1
(45) Date of Patent: *Sep. 10, 2002

(54) GRAPHIC USER INTERFACE FOR A DIGITAL CONTENT DELIVERY SYSTEM USING CIRCULAR MENUS

(75) Inventors: Allen Dwight Easty; Aaron Richard Baskin, both of Los Angeles; Jonathan Trumbull Taplin, Pacific Palisades; Jeremiah Chechik, Santa Monica; Steven Lewis Nelson, San Francisco, all of CA (US)

(73) Assignee: Intertainer, Inc., Culver City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,752

(22) Filed: Apr. 3, 1998

(51) Int. Cl.[7] .................................................. G09G 5/00
(52) U.S. Cl. ..................... 345/834; 345/835; 345/841; 345/845; 345/961
(58) Field of Search ............................... 345/352, 353, 345/348, 146, 994, 995, 356, 710, 733, 734, 809, 834, 835, 841, 848, 961; 348/12

(56) References Cited

U.S. PATENT DOCUMENTS

| | | | | |
|---|---|---|---|---|
| 5,295,243 A | * | 3/1994 | Robertson et al. | 345/348 |
| 5,485,197 A | * | 1/1996 | Hoarty | 345/349 |
| 5,515,486 A | * | 5/1996 | Amro et al. | 345/437 |
| 5,664,132 A | * | 9/1997 | Smith | 345/146 |
| 5,706,448 A | * | 1/1998 | Blades | 345/352 |
| 5,745,109 A | * | 4/1998 | Nekano | 345/340 |
| 5,790,820 A | * | 8/1998 | Vayda et al. | 345/352 |
| 5,805,154 A | * | 9/1998 | Brown | 348/12 |
| 5,828,360 A | * | 10/1998 | Anderson et al. | 345/146 |
| 5,894,589 A | * | 4/1999 | Reber et al. | 348/1 |
| 5,898,435 A | * | 4/1999 | Nagahara et al. | 345/352 |
| 5,940,076 A | * | 8/1999 | Sommers et al. | 345/339 |
| 5,973,666 A | * | 10/1999 | Challenger et al. | 345/146 |
| 5,977,975 A | * | 11/1999 | Magura et al. | 345/352 |
| 6,005,578 A | * | 12/1999 | Cole | 345/352 |
| 6,144,378 A | * | 11/2000 | Lee | 45/339 |

OTHER PUBLICATIONS

Windbase Software Announces CDSL Version 1.2., C Users Journal v10 n11, p. 136, Nov. 1992.*
Lloyd Allison, Circular Programs and Self–referential Structures, Software—Practice and Experience, Feb. 1989.*
Rex Jaechke, "Data Structures, part 8; circular lists", C Users Journal v9 n12, p. 18 (9), Dec. 1991.*
Extended Pie Menry, IBM Technical Disclosure Bulletin, v37 2b, pp. 397–398, Feb. 1994.*
Gordon Paul Kurtenback, "The Design and Evaluation of Marking Menus", 1993.*
P.J. Lyons, "The Oval Menu—Evolution and Evaluation of a Widget," IEEE, p. 252–259, 1996.*

* cited by examiner

Primary Examiner—Kristine Kincaid
Assistant Examiner—Thomas J Joseph
(74) Attorney, Agent, or Firm—Martin & Ferraro, LLP

(57) ABSTRACT

Menu structures having a balanced, predominantly circular appearance for a graphic user interface (GUI) for a delivery system of multiple categories of digital information content. The menu has two concentric rings having icons arranged along the rings identifying menu choices. The outer menu ring presents choices of categories of digital contents available from the content delivery system, while the inner menu ring presents choices of sub-categories of contents associated with a category. The icons are individually selectable. The categories and subcategories displayed are dynamically determined based on the content available to the user. The GUI system allows a user to select a category and sub-category of digital contents by selecting an icon from the outer and inner menu ring, respectively. In response to each selection, the GUI generates animated effects on the graphic display to highlight the selected item.

20 Claims, 2 Drawing Sheets

GRAPHIC USER INTERFACE FOR A DIGITAL CONTENT DELIVERY SYSTEM USING CIRCULAR MENUS

FIELD OF THE INVENTION

The present invention relates to a graphic user interface (GUI) for a delivery system of multiple categories of digital information contents, and in particular to the menu structures of the GUI having balanced, circular features.

BACKGROUND

Broadband communication technologies have made it practical to deliver full motion video and other programming services to individual users on demand. The term "broadband" describes a service or system having a transmission speed of 1.5 Mbps (megabits per second) or greater. It also refers to the characteristics of any network technology that multiplexes multiple, independent network carriers onto a single cable, usually using frequency division multiplexing. The broadband platforms that are currently available, either on a commercial scale or on an experimental basis, include upgraded cable systems using cable modems, upgraded telephone delivery systems using the Asymmetric Digital Subscriber Line (ADSL) technology, and satellite delivery systems that allow interactive communication.

A cable modem is a modem device that connects a personal computer (PC) to a coaxial or fiber optic cable that transmits television signals. Communication via a cable modem system is interactive. In an upgraded cable system, the bandwidth of the cable is typically divided into a relatively wide bandwidth for downstream data transmission (i.e. from the network to the PCs in the households) and a relatively narrow bandwidth for upstream signaling and telephony. A cable modem incorporates a tuner that separates data signals, broadcast streams and telephony signals. A cable modem may also include network management software by which the cable company can monitor the operation of the modem, as well as encryption devices.

Digital subscriber lines (DSL) technologies have been developed to provide broadband data communication over the existing copper wire twisted-pair telephone networks. Among the DSL technologies, Asymmetric Digital Subscriber Lines (ADSL) technology takes advantage of the asymmetrical nature of interactive multimedia communication. ADSL transmits downstream data through a high-speed channel to a subscriber's computer and upstream signals through a lower-speed channel to the network, while simultaneously providing "Plain Old Telephone Service" (POTS). This makes it possible to transmit full motion video over a standard telephone line.

Direct broadcast satellite (DBS) systems that are currently used for broadcast video transmission may also be used to provide broadband interactive data transmission. In a DBS system, data is typically transmitted from a geosynchronous communications satellite directly to a dish antenna attached to a personal computer. To return data, the subscriber may dial up a local service such as an Internet service provider (ISP) over a standard analog modem. A network of low orbit geosynchronous communications satellites has also been proposed to create a digital network around the globe.

The developments in broadband telecommunications technologies not only make it possible, but also create a demand for providing interactive access to a broad range of entertainment and informational programming, including full-motion videos delivered to individual users on demand (video-on-demand). As used in this specification, "on-demand" describes delivery of digital information in real time in response to individual users' requests. The technological developments also create a demand for integrated digital content delivery systems and services that integrate various categories of information and entertainment services in a single subscription service.

A digital content distribution system for providing an integrated information and entertainment content provider service is described in a copending U.S. application Ser. No. 09/054,751 entitled "Dynamic Digital Asset Management," serial number to be assigned. The system comprises a plurality of endpoint servers each connected to a plurality of end users via a communications network. Depending on the broadband distribution technologies employed, an endpoint information source may be a headend of a cable company, a central office of the telephone company (telco), an uplink facility of a satellite transmission company, or the like. The respective communication network may be a cable network, a telephone network, a satellite transmission network or the like. Each end user may be a personal computer (PC), a network computer, a set-top box for a television set or other types of computers or devices connected to a communications network.

The communication between each endpoint server and its end users is bi-directional and interactive. Each end-user computer executes a client software program, which generates and transmits user requests to the endpoint server for delivery of information contents. The end user may also transmit to the endpoint server other information, such as rating of the information and services received or other feedback information. In addition, the client software may automatically transmit information related to the user's on-line activities to the endpoint server. The client software communicates with the human user via a graphic user interface (GUI).

The categories of information contents that may be delivered through this distribution system may include movies, videos, television programs, music, music videos, concerts, books, style, software, games, travel and the like. Certain categories may provide a full pay-per-view entertainment experience on demand while other sections may allow the subscriber to obtain information on and sample potential purchases. Each category may be subcategorized according to their applicable genre. For example, music and music CDs may be sub-categorized into rock, jazz, etc., and videos and movies may be sub-categorized into comedy, drama, etc.

Such an integrated digital content delivery system requires a graphic user interface for presenting to the user multiple categories of entertainment and informational contents. It is desired that the categories of contents be presented in a balanced fashion, so that each category is presented with equal prominence. It is further desired that the user interface be easy to navigate as well as visually compelling.

SUMMARY OF THE INVENTION

The menu structure according to embodiments of the present invention may be used in the graphic user interface (GUI) for the multiple-category digital content delivery system described above.

The main feature of menu structure for the GUI comprises two or more concentric rings each representing a level of the menu system. Each menu ring comprises a plurality of icons identifying the menu items. The icons on an outer menu ring represent the categories of digital contents offered through the digital content delivery system, such as television, movies, music or the like, while the icons on an inner ring represent the sub-categories of digital contents associated with a category represented by an icon on the outer menu ring, such as jazz, rock or the like associated with the music category. The categories displayed on the inner and outer rings may be dynamically determined at the time of the display based on the content available to a given user. The icons on each menu ring may be individually selected and/or highlighted.

When the menu page is displayed, the outer menu ring is at an initial setting (i.e. an angular position) and the icon located at the top of the ring may be highlighted. A user may then select a category of digital contents from among the icons on the outer menu ring. In response to such a selection, the GUI renders an animated appearance of the outer menu ring being rotated about its center from the initial setting to a new setting in which the selected icon is located at the top of the ring and is highlighted with a highlighting icon. In addition, the inner menu ring is displayed, or re-displayed if previously displayed, with appropriate icons identifying the sub-categories of contents associated with the selected category. One of the icons, such as the one located at the top of the inner ring, is highlighted with a highlighting icon. The user may now select a sub-category of contents from among the icons on the inner menu ring. In response to the selection of a sub-category, the GUI renders an animated appearance of the highlighting icon being moved from the previously highlighted icon to the selected icon, thereby highlighting the selected icon.

In response to the user's selection of a category and a sub-category of digital contents, the computer either displays further information regarding the selected category and sub-category, or transmits a signal to the endpoint server requesting delivery of digital contents according to the selected category and sub-category.

DETAILED DESCRIPTION OF THE EMBODIMENTS

Figure 2:
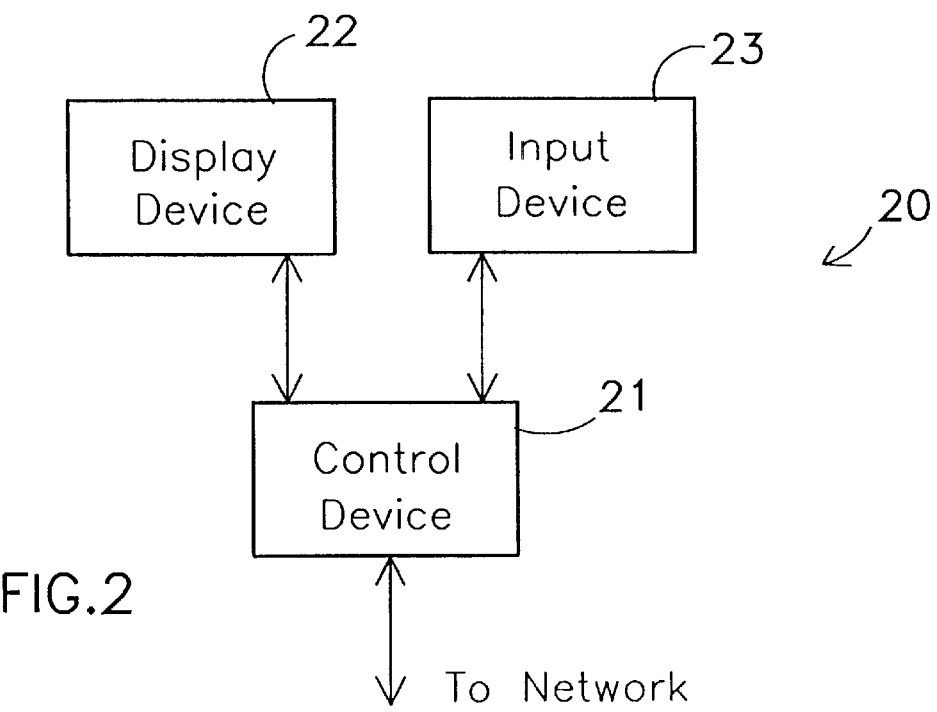
FIG. 2 is a schematic diagram illustrating a user interface device.

FIG. 2 schematically shows a user interface device 20 in which the graphic user interface system of the present invention may be employed. The interface device 20 may be a programmed computer such as a personal computer (PC), a network computer, a television set with a set-top type of device that provides access to the network though the television set, or the like. The device 20 includes a control device 21, a display device 22 and an input device 23. The control device 21 may include a programmed processor; a memory; storage devices such as magnetic storage devices, re-writeable CDs or the like. The display device 22 may be a video display, an audio display or the like. The input device 23 may be a mouse, a keyboard, a touch screen or the like. The control device 21 may be connected to a network via a cable modem, a telephone modem, a satellite dish or the like.

Figure 1A:
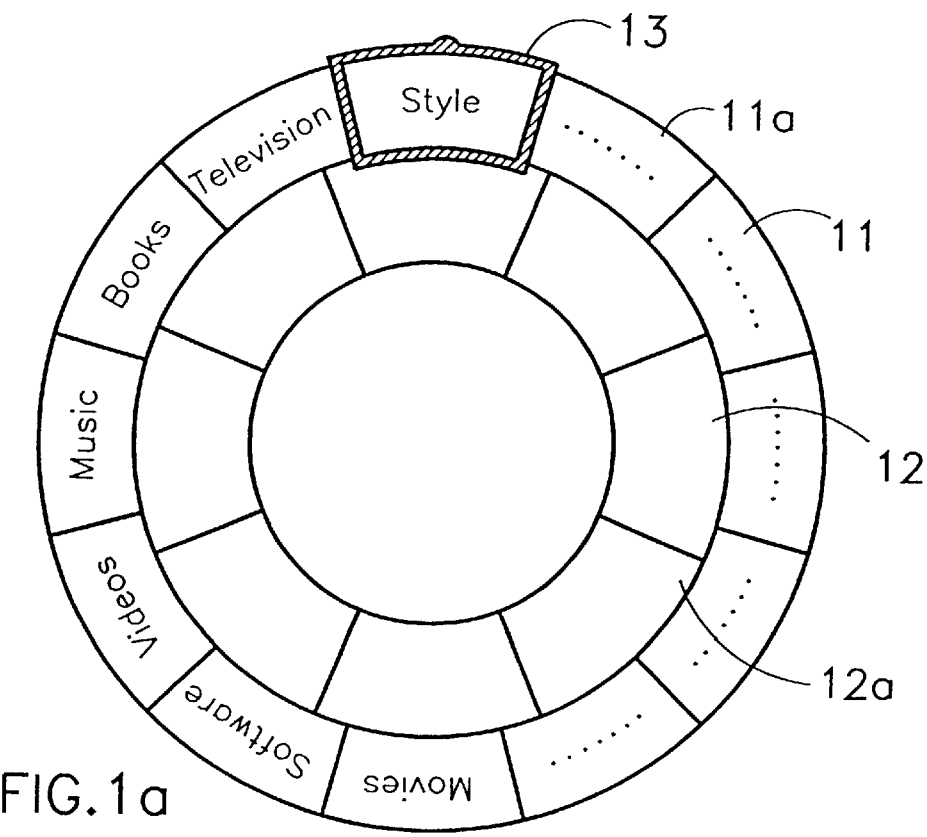
FIGS. 1a–1c illustrate the main menu system of a graphic user interface according to embodiments of the present invention.
Figure 1B:
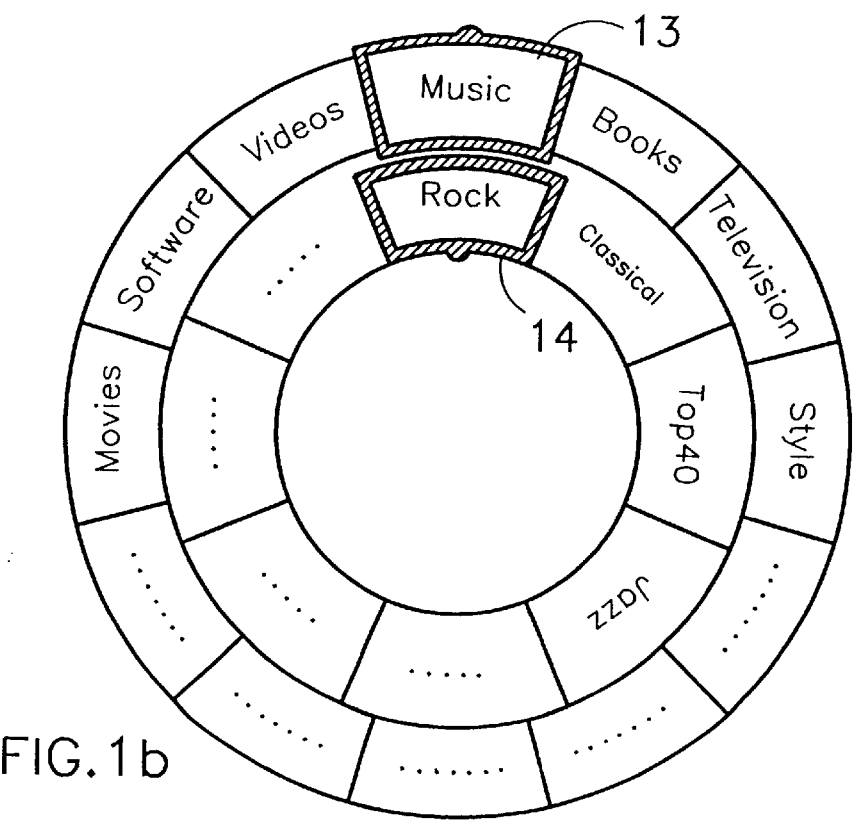
Figure 1C:
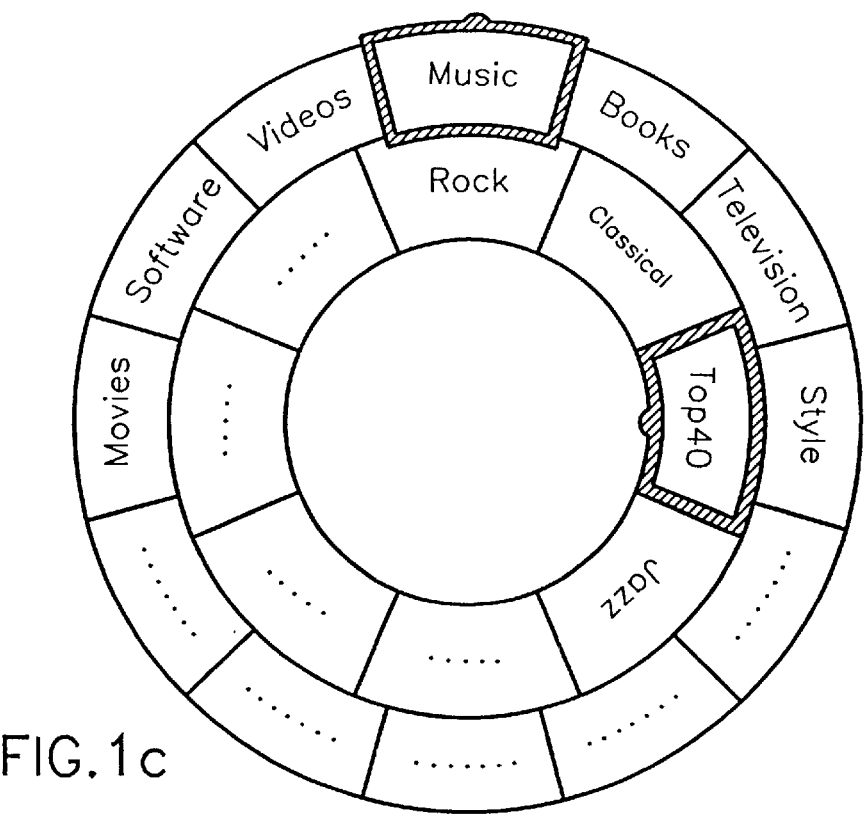

FIGS. 1a–1c illustrate the menu structure of the graphic user interface (GUI) for the multiple-category digital content delivery system according to an embodiment of the present invention. The menu, displayed on a computer screen or other display devices, comprises two concentric rings: a first, outer menu ring 11 and a second, inner menu ring 12.

The outer menu ring 11 comprises a plurality of first icons 11a arranged along a first circle, each first icon being a graphic representation indicating a category of digital contents. The categories represented by the icons 11a on the outer menu ring may include music, videos, software, movies, theater, travel, concerts, games, style, television, books or the like. The inner menu ring 12 comprises a plurality of second icons 12a arranged along a second circle, each second icon being a graphic representation indicating a subcategory or genre of digital contents associated with a category represented by an icon 11a on the outer menu ring 11. Each category represented on the outer menu ring may be subcategorized by genre or other characteristics, and the subcategories may be displayed on the inner menu ring. For example, the genres associated with the music category may include rock, classical, jazz, urban, dance, country, alternative, top 40, etc.

The categories displayed on the inner and outer rings may be dynamically determined at the time of the display based on the content available to a given user. This feature may be desirable when certain restrictions are placed on a particular user in terms of what contents the user is allowed to access. For example, a child user may not be allowed to access certain contents. By dynamically determining the categories and subcategories displayed on the inner and outer menu ring, the particular user not only is not allowed to select certain categories or subcategories, he or she will not even be presented with these categories or subcategories.

In the illustrated embodiment, the icons 11a and 12a on each menu ring 11 and 12 have arcuate shapes of substantially equal lengths and are substantially equally spaced along the respective circles. Each icon identifies the category or subcategory it represents by a graphic representation of a set of characters. The characters are arranged along the peripheral direction of the circles, with the radial direction being the "up" or "down" directions of the characters. Depending on the position of an icon along the circle, the "up" direction of the characters for that icon may either be pointing away from or towards the center of the circle. For example, the icons located in the upper half-circle may have the "up" direction pointing away from the center, and the icons located in the lower half-circle may have the "up" direction pointing to the center. The icon located exactly on the equator of the ring may be oriented either way. As a result, the characters in the icons have a predominantly upward orientation, i.e. within 90 degrees on either side of the vertical "up" direction defined by the display screen. This makes it easy for a user to identify the categories of subcategories represented by the icons. The orientation of the characters in each icon is automatically determined by the GUI.

The icons 11a and 12a on the menu rings 11a nd 12 may be selectively highlighted. Highlighting may be accomplished in a variety of ways to distinguish the highlighted icon from non-highlighted icons, such as by changing the coloring scheme of the icon, placing a border around the icon, or otherwise changing the appearance of the icon. The icons 11a and 12a on the outer and the inner menu ring 11 and 12 may be highlighted using the same or different methods. In the preferred embodiment (e.g. FIG. 1a), highlighting is achieved by surrounding the highlighted icon with a highlighting icon 13, which is a border having a distinctive shape.

On the outer menu ring 11, the plurality of first icons 11a representing the content categories are arranged along the first circle in a predetermined sequence, but the absolute positions of the icons along the first circle may vary depending on the angular "setting" of the outer ring. For example, in the example shown in FIG. 1a, the outer ring 11 is at a setting in which the "style" icon is located at or near the top of the ring, while in FIG. 1b, the outer ring 11 is at a setting in which the "music" icon is located at or near the top. At both settings, the relative positions of the icons with respect to each other do not change. Thus, by displaying the outer menu ring 11 at different settings, a visual impression may be created that the outer ring is rotated from one setting to another.

Each icon 11a and 12a on the menu rings 11 and 12 may be individually selected, for example, by moving a cursor on the display screen over the intended icon and generating an event such as a mouse click with the cursor positioned within the icon. The selection of an icon generates an input signal for the computer.

In the illustrated embodiment, the icon 11a located at a predetermined location on the outer menu ring 11, such as at or near the top of the ring, is always highlighted. Thus, depending on the setting of the outer ring, different icons will be highlighted. For example, at the setting shown in FIG. 1a, "style" is highlighted while at the setting shown in FIG. 1b, "music" is highlighted. When no icon 11a on the outer menu ring 11 is selected, such as when the menu page is initially entered into, the outer ring 11 is displayed at an arbitrary setting, which may be a predetermined setting or a random setting. Subsequently, when the user selects an icon 11a from the outer menu ring 11 representing a category of digital content, the outer ring is re-displayed at a new setting in which the selected icon is located at or near the top of the ring and is highlighted. In addition, a series of intermediate displays is generated to render an animated appearance of the outer ring 11 being rotated from the previous setting to the new setting. As used here, rotating the ring "from" one setting "to" another includes rotating it more than one turn before stopping at the intended setting. The rotation effect may be rendered by standard techniques of video transformation from one state or scene to another, including dissolve, wipe, or other generally known methods of rendering digital visual effects. More preferably, the rotation effect may be rendered by blurring individual graphic details of the rings to give the visual effects of motion. The latter method typically requires less computation than required for rendering digital visual effects.

When an icon 11a is selected from the outer menu ring 11, in addition to rotating the outer ring to the new setting, the inner ring 12 is re-displayed with appropriate icons identifying the available subcategories associated with the selected category. For example, if the "music" category is selected from the outer menu ring 11, the icons displayed on the inner menu ring 12 will include rock, classical, etc. (FIG. 1b). When the inner menu ring 12 is initially displayed in response to a selection of a content category, an arbitrary one among the icons 12a is highlighted, such as the one located at the top of the inner ring, or a randomly selected one. Highlighting is done by means of a highlighting icon 14, which is a border having a distinctive shape surrounding the highlighted icon (FIG. 1b). The user may then select an icon 12a from the second menu ring 12 representing a subcategory of digital contents. When a second icon 12a is selected, the inner menu ring 12 is re-displayed with the selected second icon highlighted, while the positions of the second icons along the second circle remain unchanged (FIG. 1c). In addition, a series of intermediate displays is generated to render an animated appearance of the highlighting icon (i.e. the border having the distinctive shape) being moved from the previous location to the location of the selected second icon, sequentially highlighting the second icons located along the second circle between the previously highlighted and the selected second icon.

In response to the user's selection of a first icon 11a representing a category and a second icon 12a representing a sub-category of digital contents, the user's computer may display further information regarding the selected category and sub-category (not shown), or transmit a signal based on the selected category and sub-category requesting delivery of digital information from the endpoint server. The endpoint server may then process the received signal and deliver the requested information to the user over the communications network.

Embodiments of the present invention are described herein. It should be recognized that various hardware components and hardware and software techniques well known in the art may be utilized to implement various aspects of the embodiments. For example, input from the user such as selecting an icon may be accomplished using keyboard, mouse, joystick, track ball, touch screen or the like. The display devices may be a computer screen, a television set or the like. The techniques for rendering various screen displays, such as cursor, cursor movements, or generating input signals from user actions are well known in the art.

Specific menu ring designs are illustrated in the specification and the drawings, but the invention is not limited to the specific examples given. For instance, the various categories and sub-categories included in the menus are subject to design choices. In addition, the menus may present choices other than categories and sub-categories of digital contents. Icons using characters are used in the illustrated embodiment, but pictures may also be used to identify the menu choices.

The means used in the described embodiments to perform the various display functions is preferably computer software cooperating with the appropriate hardware components of a computer. Other structures may also be used to perform the desired functions, such as logical circuits or the like.

Therefore, while embodiments and applications of the present invention have been shown and described, it should be apparent to those skilled in the art that many more modifications are possible without departing from the inventive concepts herein. The presently disclosed embodiments are therefore to be considered in all respects as illustrative and not restrictive, the scope of the invention being indicated by the appended claims, rather than the foregoing description. The accompanying claims are intended to cover such and other modifications as would fall within the true scope and spirit of the present invention. All changes which come within the meaning and range of equivalency of the claims are therefore intended to be embraced therein.

What is claimed is:

1. In a graphic user interface for a system for delivering multiple categories of digital contents to a plurality of users, a method for interactively presenting a plurality of content selections to the users on a display device, comprising the steps of:

identifying at least a first user and a second user of the plurality of users to determine the first and second users' access to the digital contents, the access to the digital contents of the first user being different than the access to the digital contents of the second user;

displaying a first menu ring having a plurality of first icons arranged along a first circle, each first icon representing a category of contents, each of the first icons being simultaneously visible to the users, the first menu ring being at a first setting;

subsequently rendering, in response to a first input by one of the users indicating a selection of a first icon, an animated appearance of the first menu ring rotating about an axis substantially parallel to a line of sight into the display; and subsequently displaying the first menu ring at a second setting wherein the selected first icon is at a predetermined location along the first circle;

displaying, in response to the first input by one of the users, a second menu ring comprising a plurality of second icons arranged along a second circle concentric with the first circle, each second icon representing a subcategory of contents associated with the category of contents represented by the selected first icon; and determining at the time of display the categories and subcategories associated with the first and second icons displayed in the first and second menu rings based on the contents accessible to the user.

2. The method of claim 1, wherein the predetermined location is substantially at the top of the first circle.

3. The method of claim 1, wherein the step of subsequently displaying the first menu ring includes highlighting the selected first icon.

4. The method of claim 1, wherein the plurality of first icons are spaced substantially evenly along the first circle.

5. The method of claim 1, wherein each first icon comprises a graphic representation of a set of characters identifying a category of contents, the orientation of each set of characters being automatically determined dependent upon the position of the respective first icon along the first circle.

6. The method of claim 5, wherein each set of characters representation is in a predominantly upward orientation.

7. The method of claim 1, wherein a highlighting icon is displayed highlighting a first one of the second icons, and comprising the further steps of:

rendering, in response to a second input by one of the users indicating a selection of a second icon, an animated appearance of the highlighting icon moving along the second circle; and subsequently displaying the second menu ring with the selected second icon highlighted by the highlighting icon;

whereby the steps of rendering in response to the second input and subsequently displaying the second menu ring create a visual appearance of the highlighting icon moving from the first one of the second icons to the selected second icon.

8. The method of claim 7, further comprising the step of providing a display in response to the second input by one of the users, the display provided being dependent upon the category and subcategory represented by the selected first and second icons.

9. In a graphic user interface for a system for delivering multiple categories of digital contents to a plurality of users, a method for interactively presenting a plurality of content selections to each of the users on a display device, said method comprising the steps of:

identifying at least a first and a second user of the plurality of users to determine the first and second user's access to the digital contents said access to the digital contents of the first user being different than the access to the digital contents of the second user;

displaying a first menu ring having a plurality of first icons arranged along a first circle, each first icon representing a category of contents;

displaying, in response to a first input by the first user indicating a selection of a first icon, a second menu ring comprising a plurality of second icons arranged along a second circle concentric with the first circle, each second icon representing a subcategory of contents associated with the category of contents represented by the selected first icon; and determining at the time of display the categories and subcategories associated with the first and second icons displayed in the first and second menu rings based on the contents accessible to the first user.

10. The method of claim 1, wherein the first icons include graphics.

11. The method of claim 9, wherein the first icons include graphics.

12. The method of claim 1, further comprising the steps of:

displaying a highlighting icon to highlight a first one of the second icons, and rendering, in response to the selection of one of said second icons by the user, an animated appearance of the highlighting icon moving along said second circle from the first one of the second icons to the selected second icon.

13. The method of claim 9, wherein the predetermined location is substantially at the top of the first circle.

14. The method of claim 9, wherein the selected first icon is highlighted in the step of subsequently displaying the first menu ring.

15. The method of claim 9, wherein the plurality of first icons are spaced substantially evenly along the first circle.

16. The method of claim 9, wherein each first icon comprises a graphic representation of a set of characters identifying a category of contents, the orientation of each set of characters being automatically determined dependent upon the position of the respective first icon along the first circle.

17. The method of claim 16, wherein each set of characters representation is in a predominantly upward orientation.

18. The method of claim 9, wherein a highlighting icon is displayed highlighting a first one of the second icons, and comprising the further steps of:

rendering, in response to a second input by the user indicating a selection of a second icon, an animated appearance of the highlighting icon moving along the second circle; and subsequently displaying the second menu ring with the selected second icon highlighted by the highlighting icon;

whereby said steps of rendering in response to the second input and subsequently displaying the second menu ring create a visual appearance of the highlighting icon moving from the first one of the second icons to the selected second icon.

19. The method of claim 18, further comprising providing a display in response to the second input by the user, the display provided being dependent upon the category and subcategory represented by the selected first and second icons.

20. The method of claim 9, further comprising the steps of:

displaying a highlighting icon to highlight a first one of the second icons, and rendering, in response to the selection of one of the second icons by the user, an animated appearance of the highlighting icon moving along the second circle from the first one of the second icons to the selected second icon.

* * * * *